US008666258B2

(12) United States Patent
Ice et al.

(10) Patent No.: US 8,666,258 B2
(45) Date of Patent: Mar. 4, 2014

(54) EMI SHROUD FOR A PLASTIC OPTICAL SUBASSEMBLY

(75) Inventors: Donald A. Ice, Milpitas, CA (US); Gary Sasser, San Jose, CA (US); Henry Nguyen, San Jose, CA (US); YongShan Zhang, San Jose, CA (US); Huy Anh Vu, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 543 days.

(21) Appl. No.: 12/569,877

(22) Filed: Sep. 29, 2009

(65) Prior Publication Data

US 2010/0098427 A1    Apr. 22, 2010

Related U.S. Application Data

(60) Provisional application No. 61/100,799, filed on Sep. 29, 2008.

(51) Int. Cl.
*H04B 10/00* (2013.01)

(52) U.S. Cl.
USPC ........................................ 398/138; 398/139

(58) Field of Classification Search
USPC ................................ 398/135–139
See application file for complete search history.

(56) References Cited

U.S. PATENT DOCUMENTS

| 4,598,165 | A  | * | 7/1986  | Tsai ................................ 174/36 |
| 5,106,437 | A  | * | 4/1992  | Lau et al. ......................... 156/51 |
| 5,631,443 | A  | * | 5/1997  | Scrimpshire et al. .......... 174/386 |
| 5,886,294 | A  | * | 3/1999  | Scrimpshire et al. .......... 174/359 |
| 6,064,000 | A  | * | 5/2000  | Kim ................................. 174/36 |
| 6,206,582 | B1 | * | 3/2001  | Gilliland ......................... 385/92 |
| 6,410,848 | B1 | * | 6/2002  | Shrader et al. .................. 174/36 |
| 6,663,296 | B1 | * | 12/2003 | Blair et al. ....................... 385/92 |
| 6,874,953 | B2 | * | 4/2005  | Dair et al. ........................ 385/92 |
| 6,953,289 | B2 | * | 10/2005 | Togami et al. ................... 385/92 |
| 6,966,705 | B2 | * | 11/2005 | Sato et al. ........................ 385/88 |
| 7,073,960 | B2 | * | 7/2006  | Anderl et al. ................... 385/92 |
| 7,223,028 | B2 | * | 5/2007  | Walker, Jr. ...................... 385/92 |
| 7,314,318 | B2 | * | 1/2008  | Anderl et al. ................... 385/92 |
| 7,665,903 | B2 | * | 2/2010  | Bogdan ........................... 385/88 |
| 7,976,226 | B2 | * | 7/2011  | Jeon et al. ....................... 385/88 |
| 2003/0124934 | A1 | * | 7/2003 | Bunyan et al. ................ 442/226 |
| 2005/0244109 | A1 | * | 11/2005 | Yabe et al. ..................... 385/92 |
| 2006/0045436 | A1 | * | 3/2006 | Wang et al. .................... 385/92 |
| 2007/0274643 | A1 | * | 11/2007 | Okada ............................ 385/88 |
| 2009/0162051 | A1 | * | 6/2009 | Hudgins et al. .................. 398/9 |
| 2010/0098427 | A1 | * | 4/2010 | Ice et al. ....................... 398/135 |

* cited by examiner

*Primary Examiner* — Agustin Bello
(74) *Attorney, Agent, or Firm* — Maschoff Brennan

(57) ABSTRACT

The principles of the present invention provide for a plastic ROSA that has a metallic EMI shroud covering a portion of the plastic ROSA. The combination of the plastic ROSA and the EMI shroud provides the unexpected result of having EMI shielding substantially similar to a metal ROSA.

15 Claims, 10 Drawing Sheets

US 8,666,258 B2

EMI SHROUD FOR A PLASTIC OPTICAL SUBASSEMBLY

CROSS-REFERENCE TO RELATED APPLICATIONS

This application claims the benefit of U.S. Provisional Patent Application Ser. No. 61/100,799, filed Sep. 29, 2008, which is incorporated herein in its entirety by this reference.

BACKGROUND

Electronic modules, such as electronic or optoelectronic transceiver or transponder modules, are increasingly used in electronic and optoelectronic communication. Some electronic modules can be plugged into a variety of host networking equipment. Multi-Source Agreements ("MSAs"), such as the SFF MSA, the SFP MSA, XENPAK MSA, X2 MSA and the SFP+ (IPF) MSA specify, among other things, package dimensions for electronic modules. Conformity with an MSA allows an electronic module to be plugged into host equipment designed in compliance with the MSA. Electronic modules typically communicate with a printed circuit board of a host device by transmitting electrical signals to the printed circuit board and receiving electrical signals from the printed circuit board. These electrical signals can then be transmitted by the electronic module outside the host device as optical and/or electrical signals.

One common difficulty associated with the operation of electronic modules is the generation of electromagnetic interference ("EMI"). The generation of EMI by an electronic module is a matter of significant concern because such EMI can seriously impair, if not prevent, the proper operation of other systems and devices in the vicinity. Thus, the control of EMI effects is an important consideration in the design and use of electronic modules.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Example embodiments of the present invention relate to various mechanical systems that can be implemented in an electronic module, such as an electronic or optoelectronic transceiver or transponder module. Some electronic modules can be configured to be plugged into a variety of host equipment. Some example embodiments of the invention can help maintain electromagnetic interference ("EMI") emitted outside the host equipment at acceptably low levels.

Example Optoelectronic Transceiver Module

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

Figure 1:
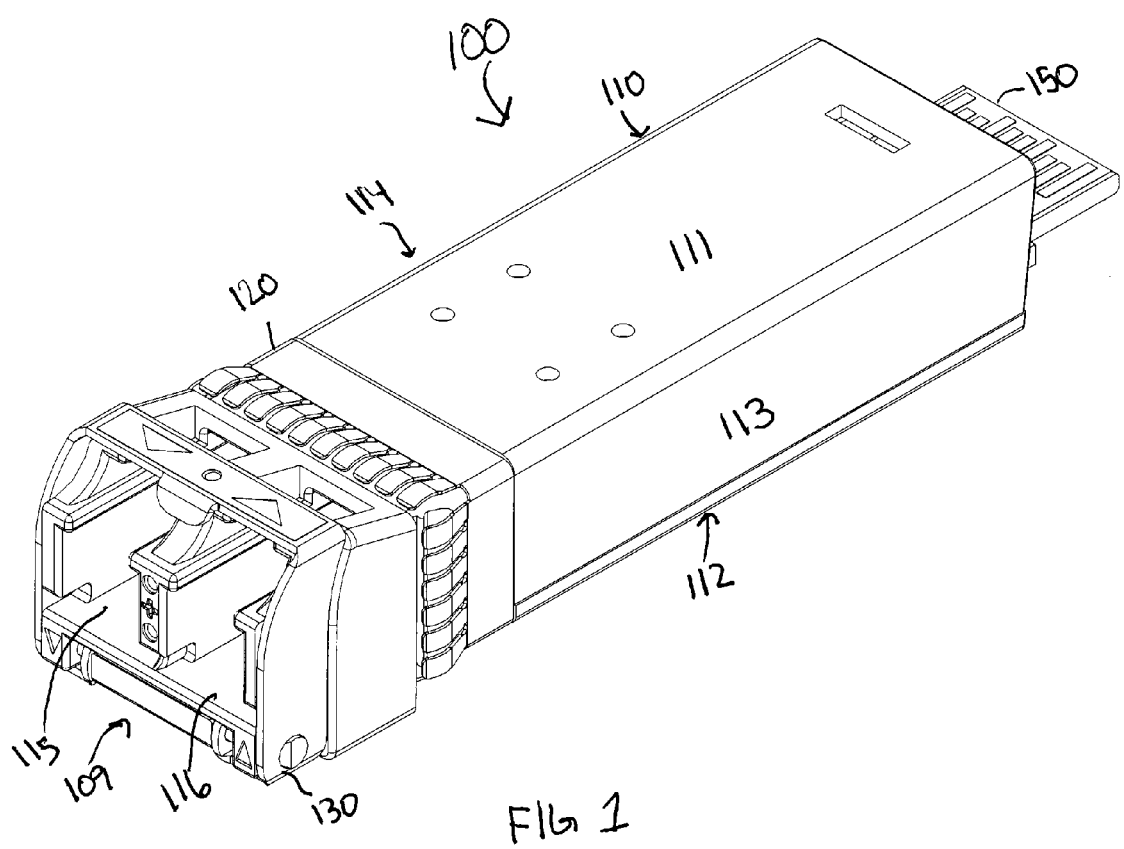
FIG. 1 illustrates an example optoelectronic transceiver module.

Reference is first FIG. 1, which illustrates an embodiment of an optoelectronic transceiver module 100 for use in transmitting and receiving optical signals in connection with a host device (not shown). The optoelectronic transceiver module 100 can be configured for optical signal transmission and reception at a variety of per-second data rates including, but not limited to, 1 Gbit, 2 Gbit, 2.5 Gbit, 4 Gbit, 8 Gbit, 10 Gbit, or higher. Furthermore, the optoelectronic transceiver module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic transceiver module 100 can be configured to support various transmission standards including, but not limited to, Fast Ethernet, Gigabit Ethernet, 10 Gigabit Ethernet, and 1x, 2x, 4x, and 10x Fibre Channel. In addition, although one example of the optoelectronic transceiver module 100 is configured to have a form factor that is substantially compliant with the SFP+ (IPF) MSA, the optoelectronic transceiver module 100 can alternatively be configured to have a variety of different form factors that are substantially compliant with other MSAs including, but not limited to, the SFF MSA, XENPAK MSA, X2 MSA or the SFP MSA.

As shown in FIG. 1, optoelectronic transceiver module 100 includes various components, including an optoelectronic transceiver shell 110 (hereinafter also referred to simply as shell 110) that includes a top portion 111, a bottom portion 112, a first side portion 113, a second side portion 114, and a front portion 109. As further shown, front portion 109 defines an output port 115 and an input port 116.

FIG. 1 also shows that optoelectronic transceiver module 100 includes a latch system 130 that is configured to help secure optoelectronic transceiver module 100 to a host computing device. In addition, optoelectronic transceiver module 100 includes a collar clip 120 configured to help reduce EMI when optoelectronic transceiver module 100 is connected to the host computing device. Of course it will be appreciated that optoelectronic transceiver module 100 need not include the latch system 130 and/or the collar clip 120.

The shell 110 can be formed using a die casting process. One example material from which the shell 110 can be die cast is zinc, although the shell 110 may alternatively be die cast from other suitable materials such as aluminum, magnesium, or other suitable materials. In addition, shell 110 may also be formed using various machining techniques as known in the art.

Figure 2:
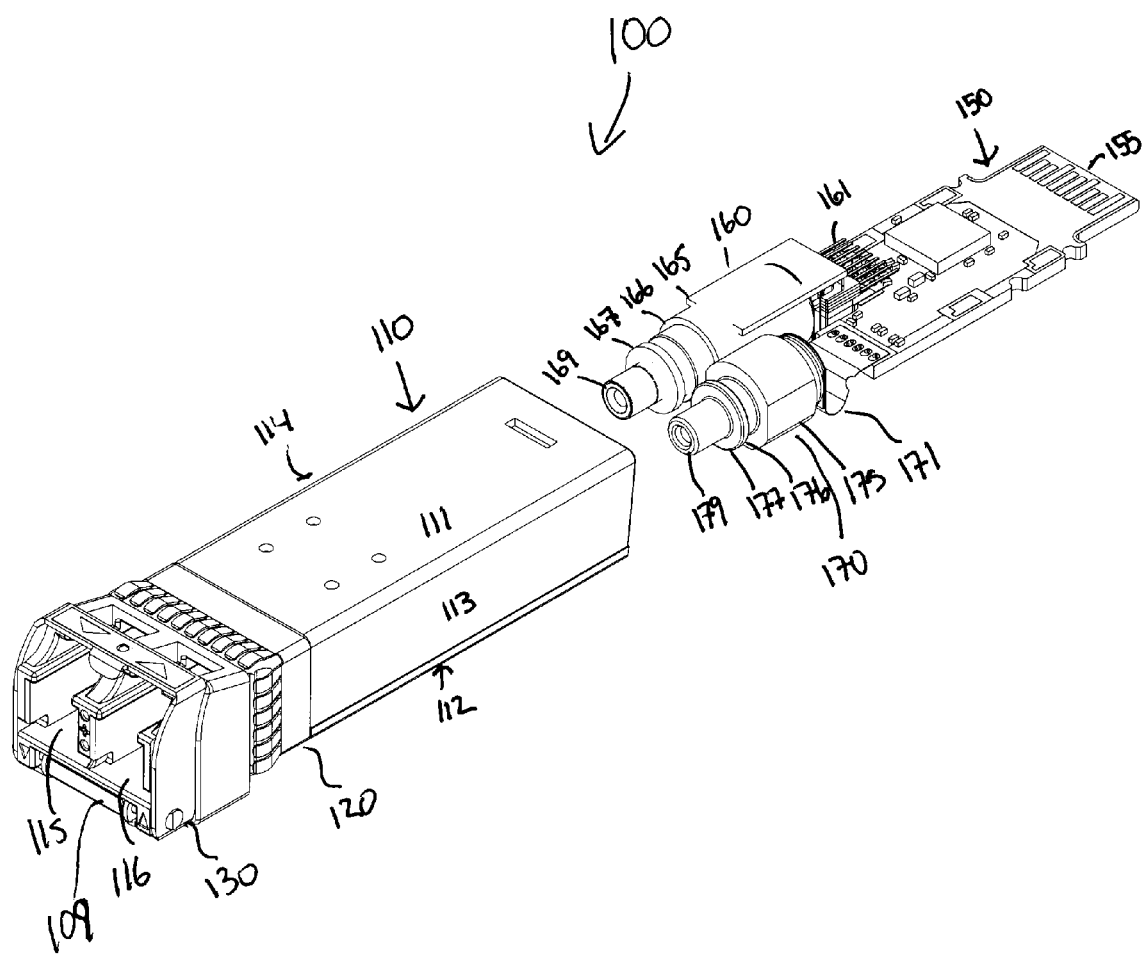
FIG. 2 illustrates various components of the example optoelectronic transceiver module of FIG. 1.

As shown in FIGS. 1 and 2, the optoelectronic transceiver module 100 also includes a printed circuit board ("PCB") 150 with various optical transceiver electronics mounted onto the PCB 150. As shown, PCB 150 and its various electronics are configured to be placed inside shell 110.

Turning now to FIG. 2, the PCB 150 includes a transmitter optical subassembly ("TOSA") 160, a receiver optical subassembly ("ROSA") 170, electrical interfaces 161 and 171, and an edge connector 155. The two electrical interfaces 161 and 171 are used to electrically connect the TOSA 160 and the ROSA 170, respectively, to the PCB 150.

The TOSA 160 of the optoelectronic transceiver module 100 includes a barrel 165 within which an optical transmitter, such as a laser, (not shown) is disposed. The optical transmitter is configured to convert electrical signals received through the PCB 150 from a host device (not shown) into corresponding optical signals. The TOSA 160 also includes a flange 166 and a nose piece 167. The nose piece 167 defines a port 169. The port 169 is configured to optically connect the optical transmitter disposed within the barrel 165 with a fiber-ferrule (not shown) disposed within the output port 115.

Similarly, the ROSA 170 of the optoelectronic transceiver module 100 includes a barrel 175, a flange 176, and a nose piece 177. The nose piece 177 defines a port 179. The port 179 is configured to optically connect an optical receiver, such as a photodiode (not shown), disposed within the barrel 175 to a fiber-ferrule (not shown) disposed within the input port 116. The optical receiver is configured to convert optical signals received from the fiber-ferrule into corresponding electrical signals for transmission to a host device (not shown) through the PCB 150.

As further disclosed in FIG. 2, the PCB 150 includes optical transceiver electronics 180. Such electronics may include, but is not limited to, a controller, a laser driver, and a post-amplifier, each of which is configured to help allow optoelectronic transceiver module 100 to convert optical signals into electrical signals and to convert electric signals into optical signals.

Aspects of an EMI Shroud for a ROSA

As described above in relation to FIG. 2, the optical transceiver 100 includes a ROSA 170. Typically, a ROSA may be constructed of either metal or plastic. However, metal and plastic ROSAs have different Electromagnetic Interference (EMI) shielding properties. For example, a metal ROSA has intrinsic properties that make them less susceptible to EMI leakage. In other words, the metal comprising the ROSA acts as a natural EMI shield. However, metal ROSAs are typically machined parts and so they are expensive and time consuming to produce.

Plastic ROSAs, on the other hand, may be produced using an injection molding process or the like that make them inexpensive to produce. However, the optics that are contained in the ROSA are typically molded into the ROSA with no additional mechanical parts. For example, in one embodiment, the photo diode of the ROSA is placed in a TO can and then the TO can is glued into the plastic ROSA. Thus, because the ROSA is plastic, and because it is being used for the optics as well as the mechanics, conductive fillers or the like cannot be placed within the ROSA, which causes the plastic ROSA to have poor EMI shielding performance. Accordingly, it would be desirable to implement a plastic ROSA with improved EMI shielding capabilities.

Advantageously, the principles of the present invention provide for an EMI shroud that may be used with a plastic ROSA. The EMI shroud is configured to cause the plastic ROSA to achieve EMI shielding results substantially similar to a metal ROSA while still retaining the cost effective and manufacturing advantages of a plastic ROSA. As one of skill in the art will appreciate, it would not be expected that a plastic ROSA that having a metallic EMI shroud covering a portion of it would have EMI shielding results substantially similar to a metal ROSA. However, as will be shown herein, the inventors of the present invention have found just such a result.

Figure 3:
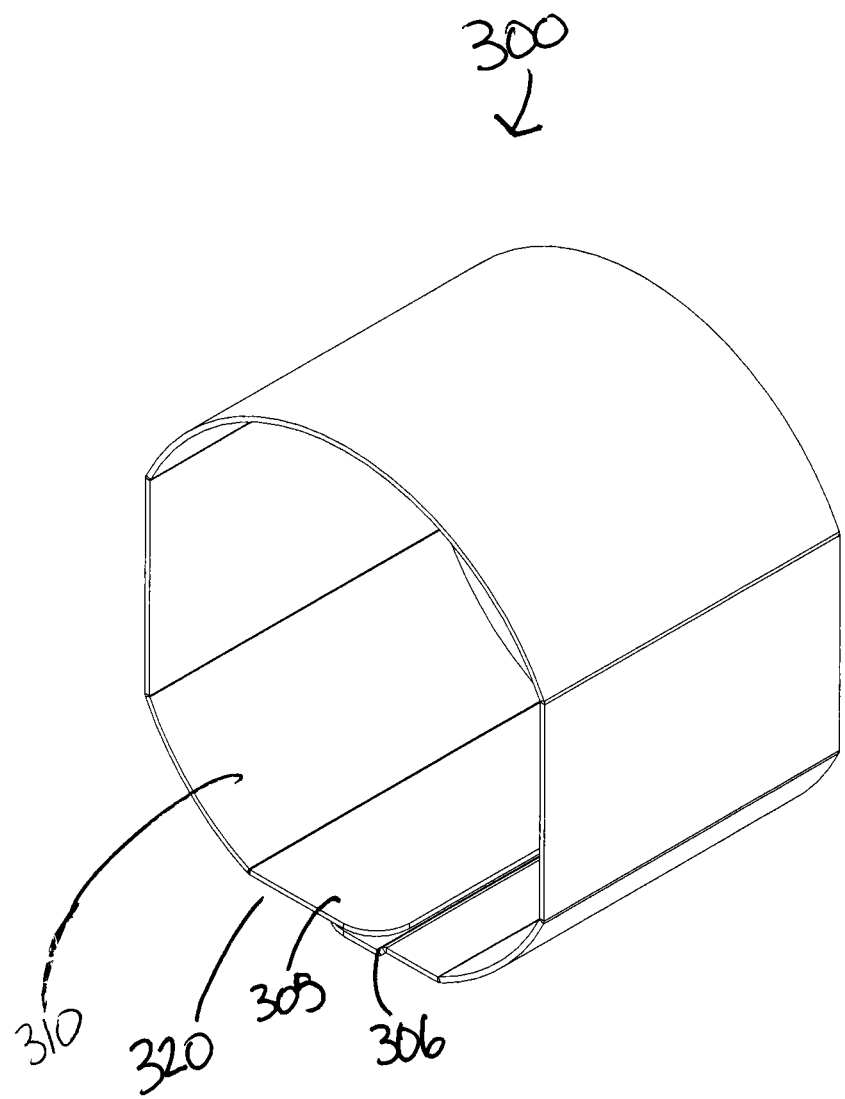
FIG. 3 illustrates an example EMI shroud in accordance with an embodiment of the present invention.
Figure 4:
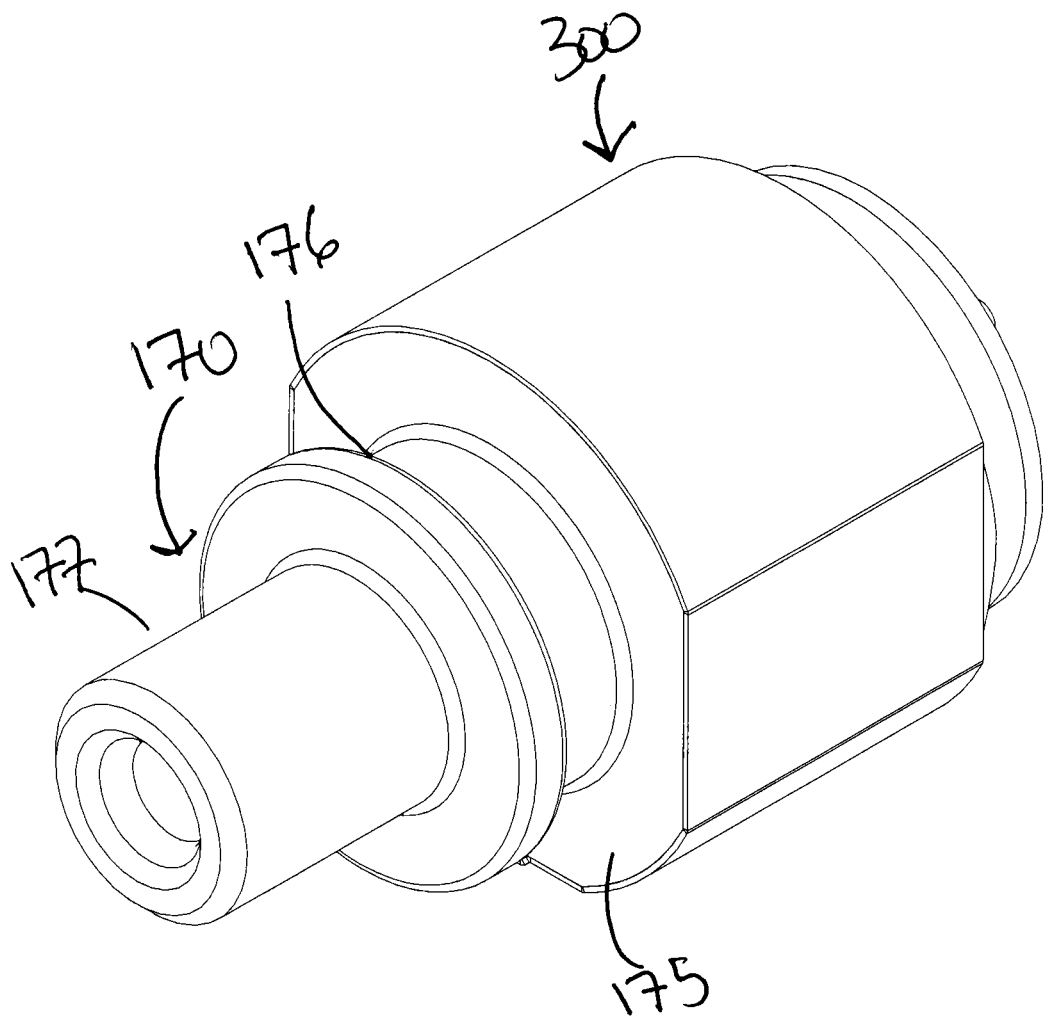
FIG. 4 illustrates an a plastic ROSA that implements the EMI shroud of FIG. 3.

Reference is now made to FIGS. 3 and 4, which illustrate one embodiment of an EMI shroud 300, which may comprise a means for providing EMI shielding results substantially similar to a metal ROSA. As illustrated, EMI shroud 300 is a hollow piece of metal that forms a cavity 310 when the shroud 300 is wrapped around such that a first end 305 wraps around and mates with a second end 306. As can be seen in FIG. 3, in the illustrated embodiment the first and second ends 305 and 306 form a slight overlap 320 at the point where they mate.

In some embodiments, the EMI shroud 300 may be comprised of a thin piece of aluminum foil tape. In other embodiments, the EMI shroud 300 may be comprised of a thin piece of some other metal or other material with EMI shielding properties as circumstances warrant.

Turning now to FIG. 4, an illustration of the EMI shroud 300 being wrapped around the ROSA 170 is shown, which in this embodiment is made of plastic or similar material. As illustrated, the EMI shroud 300 wraps around the plastic barrel 175 of the ROSA 170. That is, the first end 305 wraps around the plastic barrel 175 until it mates with second end 306 so that the barrel 175 fills the cavity 310. The two ends may include the overlap 320 as previously described. In one embodiment, the EMI shroud 300 includes a pressure sensitive adhesive that causes the EMI shroud to adhere to the barrel 175 of the ROSA 170. Of course, it will be appreciated that other known methods of adhering EMI shroud 300 to the ROSA 170 may also be used as circumstances warrant.

As described above, the PCB 150 that includes the ROSA 170 is typically placed in the metallic shell 110 prior to operation of the optoelectronic module 100. It should be noted, however, that the EMI shroud 300, when wrapped around ROSA 170 and thereby also inserted into shell 110, is not intentionally grounded to the module shell 110 but may be grounded by incidental contact only. In other words, the EMI shielding results produced by EMI shroud 300 are not merely caused by the shroud being grounded to the shell 110. Thus, as previously explained, the unexpected EMI shielding results of the combination of the plastic ROSA 170 and the EMI shroud 300 is not caused by grounding to the metallic shell 110.

As mentioned, implementing EMI shroud 300 as part of ROSA 170 has been shown to provide unexpected EMI shielding results very similar to the EMI shielding of a metal ROSA. FIGS. 5A-5C, 6A-6B and 7A illustrate test results showing the EMI shielding provided by the principles of the present invention.

Figure 5A:
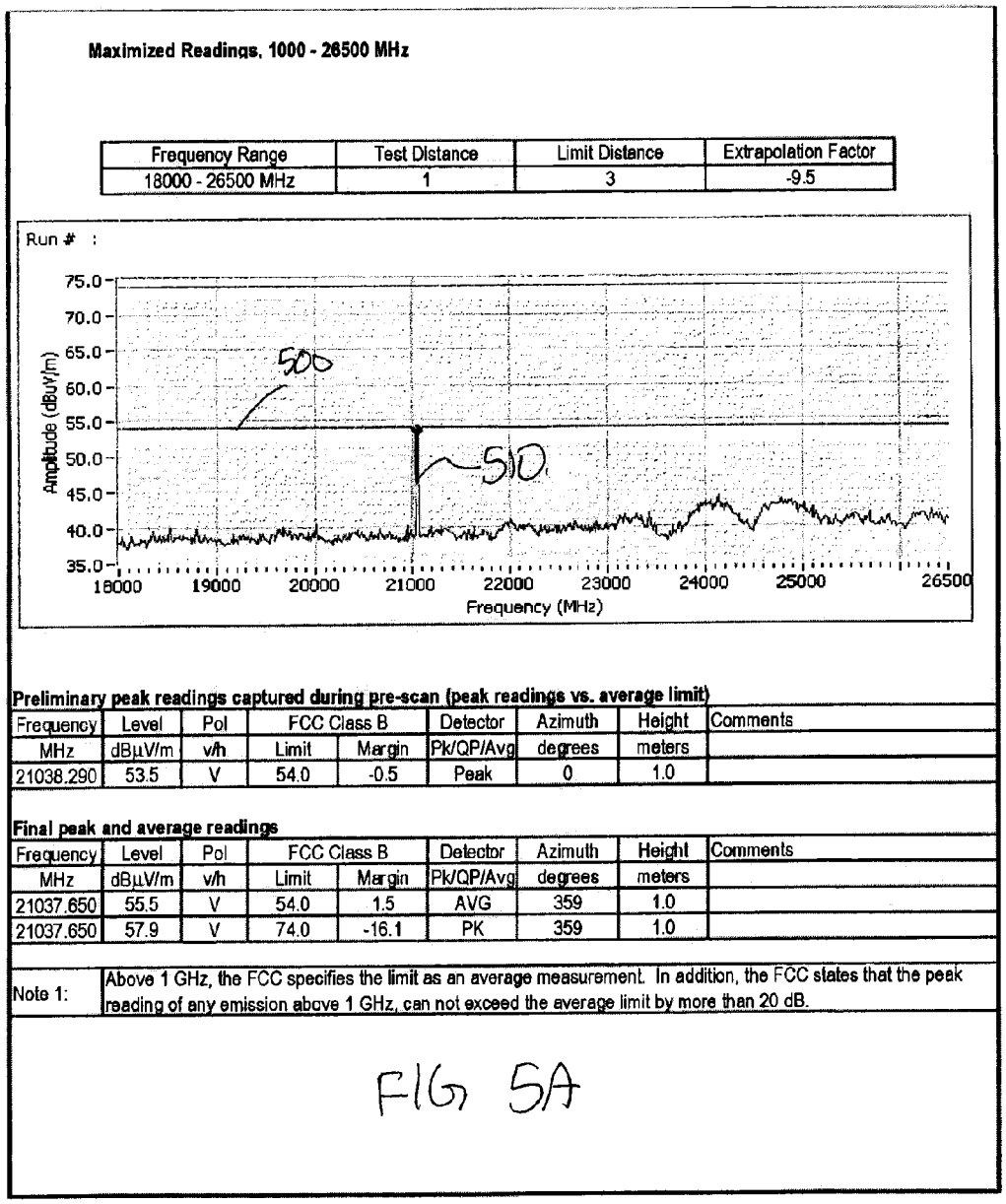
FIGS. 5A-5C illustrate EMI test results of an optoelectronic module with a plastic ROSA that does not implement the EMI shroud of FIG. 3.
Figure 5B:
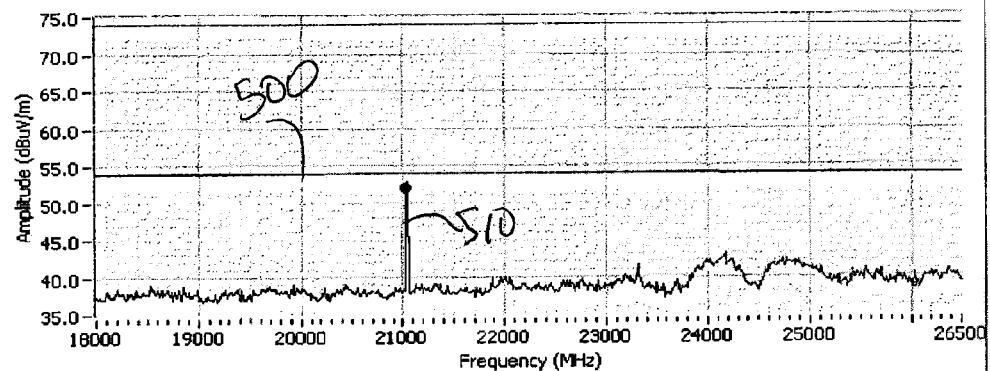
Figure 5C:
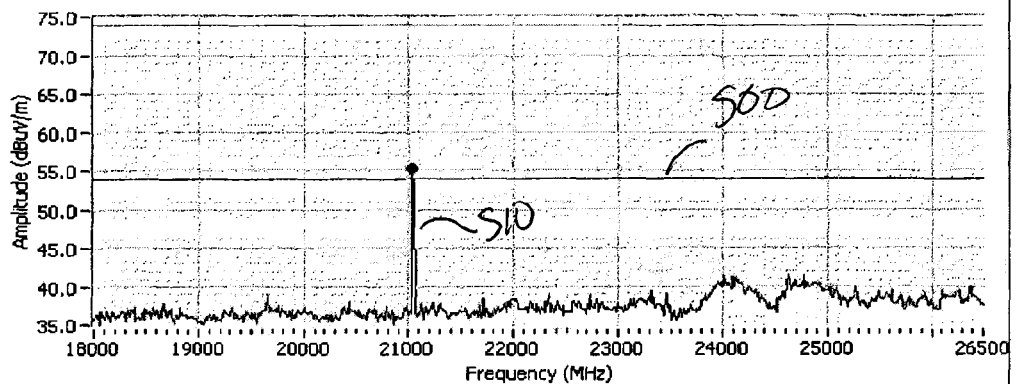

Attention is first made to FIGS. 5A-5C (also referred to as FIG. 5), which illustrate simultaneous EMI testing of four optoelectronic transceiver modules 100 that do not implement an EMI shroud 300 as part of the plastic ROSA 170. In other words, the four modules are running simultaneously while the test is being performed as these modules are typically used in dense applications where multiple modules 100 are simultaneously operated.

As shown, the FIG. 5 each illustrate a horizontal line 500 that represents the FCC Class B limit over a range of frequencies. As is well known, it is important that a module 100 not exceed the Class B limit when in operation.

Turning to FIG. 5A, a test point 510 taken at approximately 21 GHz during a first test run is shown. As illustrated, test point 510 is right at the horizontal line 500 limit.

Turning to FIG. 5B, a test point 510 taken at approximately 21 GHz during a second test run is shown. As illustrated, test point 510 is slightly below the horizontal line 500 limit.

Turning to FIG. 5C, a test point 510 taken at approximately 21 GHz during a third test run is shown. As illustrated, test point 510 exceeds the horizontal line 500 limit.

Accordingly, FIGS. 5A-5C show that without implementing an EMI shroud 300, the optoelectronic transceiver modules 100 are very close to or exceed the Class B limit. Thus, the lack of any EMI shielding in the plastic ROSA 170 causes the optoelectronic transceiver modules 100 to operate near, with very little margin, or above the acceptable limit.

Figure 6A:
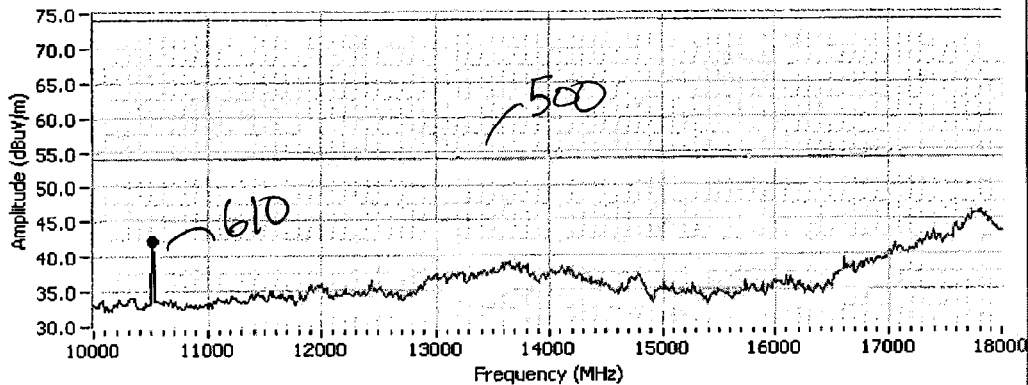
FIGS. 6A-6B illustrate EMI test results of an optoelectronic module with a plastic ROSA that does implement the EMI shroud of FIG. 3.
Figure 6A:
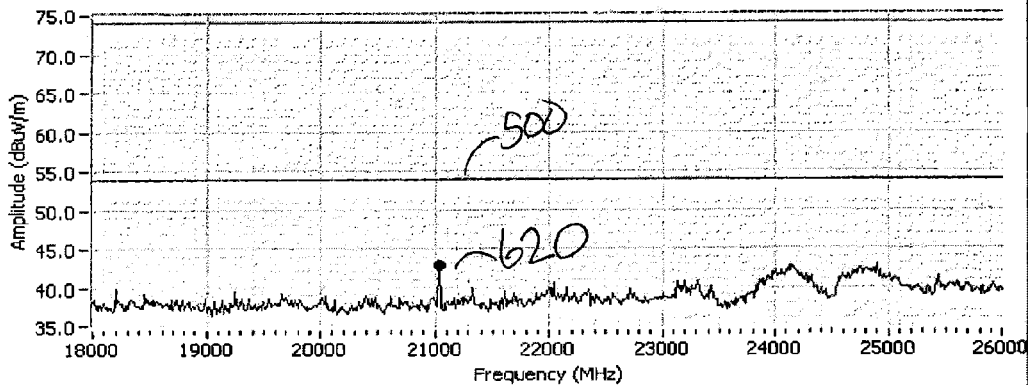
Figure 6B:
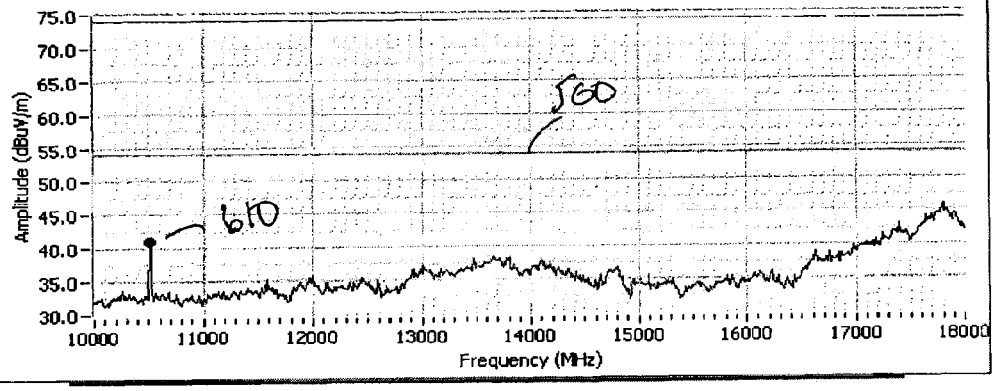
Figure 6B:
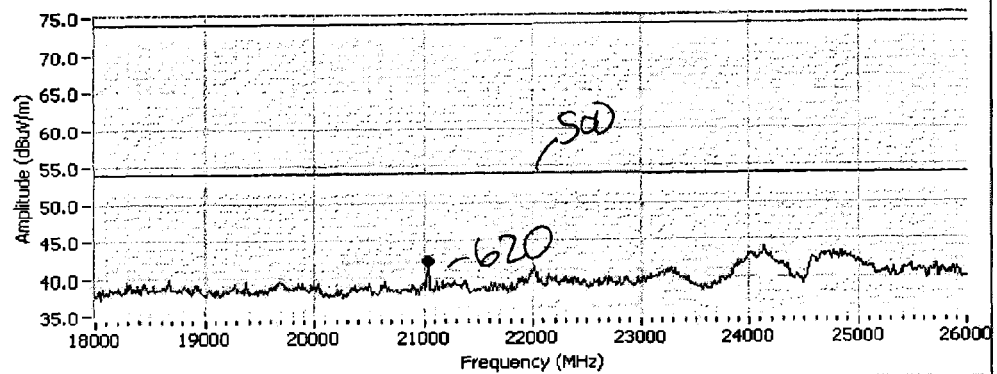

Reference is now made to FIGS. 6A and 6B (also referred to as FIG. 6), which illustrate simultaneous EMI testing of four optoelectronic transceiver modules 100 that do implement an EMI shroud 300 as part of the plastic ROSA 170. As shown, the FIG. 6 each illustrate the horizontal line 500 that represents the FCC Class B limit over a range of frequencies.

Turning to FIG. 6A, a test point 610 taken at approximately 10.5 GHz during a first test run is shown. Also illustrated is a test point 620 taken at approximately 21 GHz during the first test run. As illustrated, test points 610 and 620 are significantly below the horizontal line 500 limit.

Turning to FIG. 6B, a test point 610 taken at approximately 10.5 GHz during a second test run is shown. Also illustrated is a test point 620 taken at approximately 21 GHz during the second test run. As illustrated, test points 610 and 620 are significantly below the horizontal line 500 limit.

Accordingly, FIGS. 6A-6B show that when implementing an EMI shroud 300, the optoelectronic transceiver modules 100 are significantly below the Class B limit. Further, when comparing the test point 620 of FIGS. 6A and 6B with test point 510 of FIGS. 5A-5C, it is clearly seen that at the test frequency of 21 GHz implementing the EMI shroud 300 provides significant EMI shielding that is not present when an EMI shroud 300 is not implemented.

Figure 7:
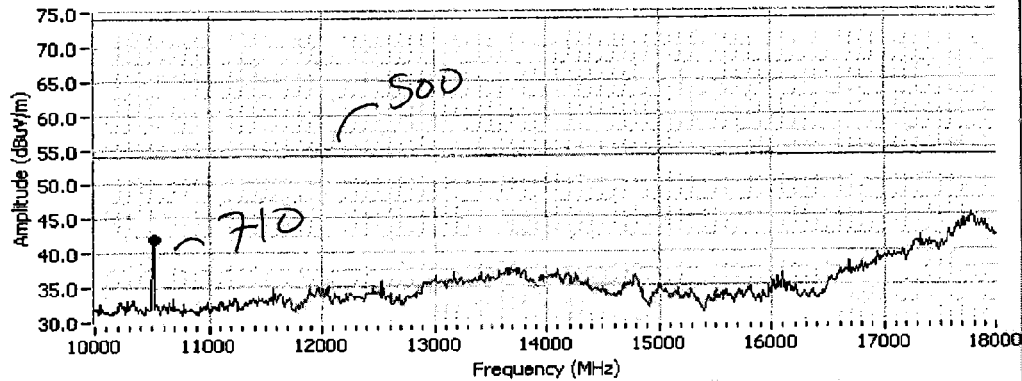
FIG. 7 illustrates EMI test results of an optoelectronic module with a metal ROSA.
Figure 7:
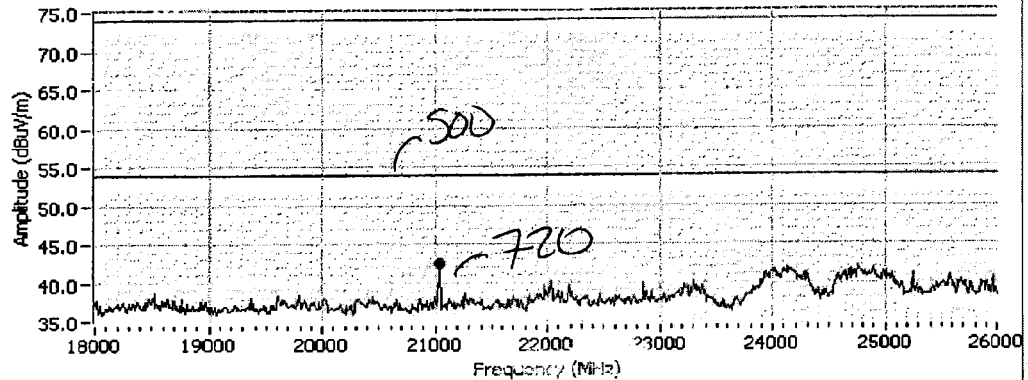

Reference is now made to FIG. 7 which illustrates simultaneous EMI testing of four optoelectronic transceiver modules 100 that implement a metal ROSA 170. Note that due to their large size, FIG. 7 includes more than one page and has been designated accordingly. As shown, the FIG. 7 illustrates the horizontal line 500 that represents the FCC Class B limit over a range of frequencies.

As shown in FIG. 7, a test point 710 taken at approximately 10.5 GHz during a first test run is shown. Also illustrated is a test point 720 taken at approximately 21 GHz during the first test run. As illustrated, test points 710 and 720 are significantly below the horizontal line 500 limit.

A comparison of test points 710 and 720 of FIG. 7 with test points 610 and 620 of FIGS. 6A and 6B shows that implementing the EMI shroud 300 with the plastic ROSA 170 provides similar EMI shielding as a metal ROSA. Accordingly, use of EMI shroud 300 provides for an inexpensive way to give a plastic ROSA the necessary EMI shielding so that the module 100 does not exceed the acceptable EMI limits when implementing an inexpensive plastic ROSA.

Accordingly, the principles of the present invention provide for a plastic ROSA that has a metallic EMI shroud covering a portion of the plastic ROSA. The combination of the plastic ROSA and the EMI shroud provides the unexpected result of having EMI shielding substantially similar to a metal ROSA.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A receiver optical subassembly (ROSA) comprising:
a plastic body comprising:
a barrel; and
a nose piece defining a port configured to optically connect the optical receiver to a fiber-ferrule disposed within the port;
an optical receiver disposed within the barrel; and
an electromagnetic interference (EMI) shroud including a thin piece of material with EMI shielding properties wrapped around an exterior of the plastic body,
wherein:
the EMI shroud substantially covers the length of the barrel;
the EMI shroud completely surrounds the portion of the length of the barrel within which the optical receiver is disposed;
a first end of the EMI shroud overlaps with a second end of the EMI shroud where the first end and the second end mate; and
the EMI shroud is configured to provide EMI shielding for the ROSA that is substantially similar to EMI shielding that would be provided by the plastic body if the plastic body were made of metal without the EMI shroud being grounded to a housing of an optoelectronic transceiver within which the ROSA is disposed.

2. The ROSA in accordance with claim 1, wherein the EMI shroud comprises a thin piece of aluminum foil tape.

3. The ROSA in accordance with claim 1, wherein the EMI shroud comprises a thin piece of metal with EMI shielding properties.

4. The ROSA in accordance with claim 1, wherein the EMI shroud is adhered to an exterior of the plastic body by a pressure sensitive adhesive.

5. A receiver optical subassembly (ROSA) comprising:
a plastic body comprising:
a barrel;
a nose piece defining a port configured to optically connect the optical receiver to a fiber-ferrule disposed within the port; and
a flange positioned in between the barrel and the nose piece, the flange having a diameter that is greater than a diameter of the nose piece and less than a diameter of the barrel, the flange being spaced apart from the barrel by a region having a diameter that is less than the diameter of the flange;
an optical receiver disposed within the barrel; and
an electromagnetic interference (EMI) shroud wrapped around and adhered to an exterior of the plastic body,
wherein:
the EMI shroud completely surrounds the portion of the length of the barrel within which the optical receiver is disposed;
a first end of the EMI shroud overlaps with a second end of the EMI shroud where the first end and the second end mate; and
the EMI shroud is configured to provide EMI shielding for the ROSA that is substantially similar to EMI shielding that would be provided by the plastic body if the plastic body were made of metal without the EMI shroud being grounded to a housing of an optoelectronic transceiver within which the ROSA is positioned.

6. An optoelectronic transceiver module comprising:
a housing;
a printed circuit board disposed within the housing; and
the ROSA as recited in claim 1 disposed within the housing.

7. The optoelectronic transceiver module in accordance with claim 6, wherein the EMI shroud comprises a thin piece of aluminum foil tape.

8. The optoelectronic transceiver module in accordance with claim 6, wherein the EMI shroud comprises a thin piece of metal with EMI shielding properties.

9. The optoelectronic transceiver module in accordance with claim 6, wherein the EMI shroud is adhered to the plastic exterior body of the OSA by a pressure sensitive adhesive.

10. The ROSA in accordance with claim 1, the plastic body further comprising a flange positioned in between the barrel and the nose piece, the flange having a diameter that is greater than a diameter of the nose piece and less than a diameter of the barrel, the flange being spaced apart from the barrel by a region having a diameter that is less than the diameter of the flange.

11. The ROSA in accordance with claim 5, wherein the EMI shroud comprises a piece of aluminum foil tape.

12. The ROSA in accordance with claim 5, wherein the EMI shroud comprises a thin piece of metal with EMI shielding properties.

13. The ROSA in accordance with claim 5, wherein the EMI shroud is adhered to an exterior of the plastic body by a pressure sensitive adhesive.

14. The optoelectronic transceiver module in accordance with claim 6, wherein the plastic body further comprises a flange positioned in between the barrel and the nose piece, the flange having a diameter that is greater than a diameter of the nose piece and less than a diameter of the barrel, the flange being spaced apart from the barrel by a region having a diameter that is less than the diameter of the flange.

15. The ROSA in accordance with claim 5, wherein:
the EMI shroud includes a thin piece of material with EMI shielding properties.

* * * * *

UNITED STATES PATENT AND TRADEMARK OFFICE
CERTIFICATE OF CORRECTION

| | | |
|---|---|---|
| PATENT NO. | : 8,666,258 B2 | Page 1 of 1 |
| APPLICATION NO. | : 12/569877 | |
| DATED | : March 4, 2014 | |
| INVENTOR(S) | : Ice et al. | |

It is certified that error appears in the above-identified patent and that said Letters Patent is hereby corrected as shown below:

In the Claims

In Column 7, Claim 9, Line 9, delete "OSA" and insert -- ROSA --, therefor.

Signed and Sealed this
Second Day of September, 2014

Michelle K. Lee
*Deputy Director of the United States Patent and Trademark Office*